United States Patent [19]

Stapleton et al.

[11] 4,035,300

[45] July 12, 1977

[54] FILTER ARRANGEMENT WITH ALLOWANCES FOR MANUFACTURING TOLERANCES

[75] Inventors: Edward L. Stapleton; John B. Waggoner, both of Joliet, Ill.

[73] Assignee: Caterpillar Tractor Co., Peoria, Ill.

[21] Appl. No.: 718,693

[22] Filed: Aug. 30, 1976

[51] Int. Cl.² ........................................ B01D 27/08
[52] U.S. Cl. ........................... 210/172; 210/323 T; 210/232
[58] Field of Search .......... 210/167, 168, 232, 172, 210/323 T, 448, 455, 466, 440, 441

[56] References Cited

U.S. PATENT DOCUMENTS

| 3,314,542 | 4/1967 | Kudlaty | 210/172 X |
|---|---|---|---|
| 3,653,512 | 4/1972 | Brown | 210/172 X |
| 3,685,658 | 8/1972 | Baldwin | 210/440 |
| 3,786,920 | 1/1974 | Raymond | 210/232 X |
| 3,886,072 | 5/1975 | Deselan | 210/441 X |
| 3,900,400 | 8/1975 | Whitfield | 210/323 T |

Primary Examiner—John Adee
Attorney, Agent, or Firm—Phillips, Moore, Weissenberger, Lempio & Majestic

[57] ABSTRACT

The invention is concerned with an improvement in a hydraulic reservoir which comprises a tank having internally thereof filter means attached longitudinally between a first and a second generally parallel side thereof, said filter means including generally tubular filter element means extending generally longitudinally between said first and second sides of said tank and means for introducing a hydraulic fluid from an exterior of said tank to an interior of said element means from adjacent said first side of said tank. The improvement of the present invention comprises a tube within said tank surrounding said element means and extending longitudinally generally the length thereof, said tube including exit means therethrough through which said hydraulic fluid passes after passage thereof from the interior to an exterior of said element means; and means for compressibly sealing a first end of said tube adjacent said second side of said tank.

5 Claims, 3 Drawing Figures

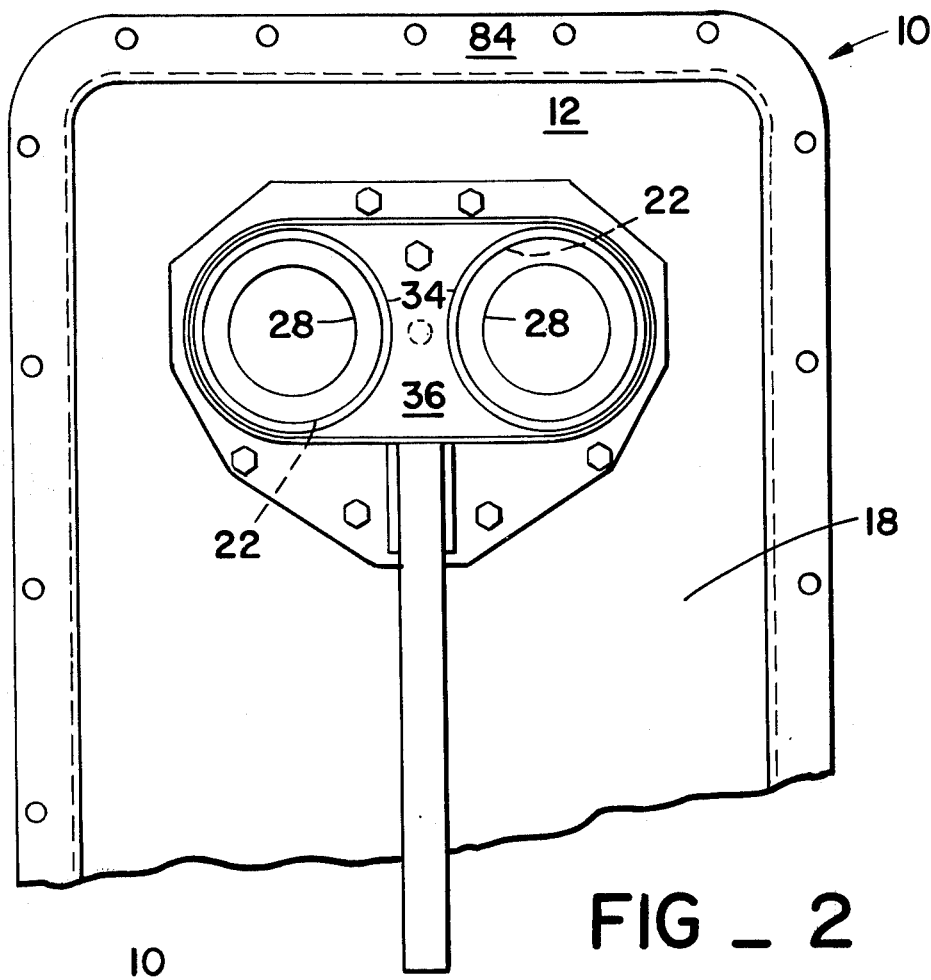
FIG_2
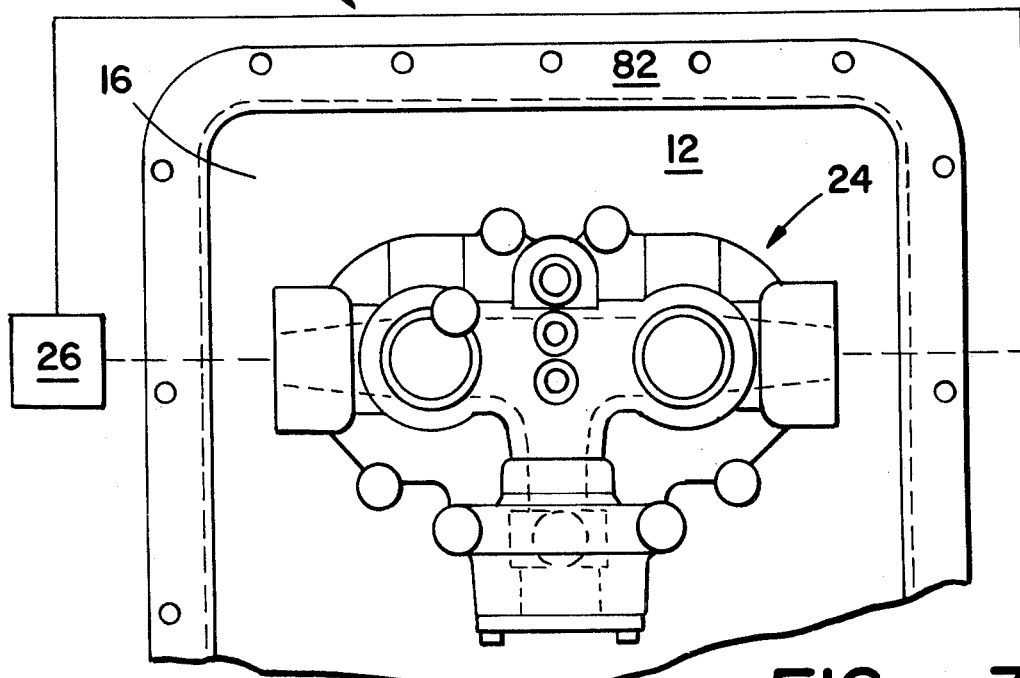
FIG_3

FILTER ARRANGEMENT WITH ALLOWANCES FOR MANUFACTURING TOLERANCES

BACKGROUND OF THE INVENTION

1. Field of the Invention

The invention is particularly concerned with filtering systems for hydraulic reservoirs and more particularly for improving such filtering systems when they are located within hydraulic reservoirs. More particularly, the invention is concerned with a particular means for arranging filters within a hydraulic reservoir which makes allowance for manufacturing tolerances whereby these tolerances can be relatively large and yet the filter means will still be effectively and relatively exactly placed within the reservoir.

2. Prior Art

The majority of prior art filters for liquid systems a illustrated for example by the teachings of U.S. Pat. No. 3,685,658 have been mounted externally of the reservoir or sump of such a system. In such a situation, one has not been generally faced with the problems encountered in mounting a filter within a reservoir. Some filter elements are also used within hydraulic reservoirs such as those disclosed in, for example, U.S. Pat. Nos. 3,886,072 and 3,900,400 but these are of considerably different structure, operation and mounting than are the srtuctures of the present invention.

One of the more important problems which occur when one desires to mount a filter within a reservoir is that the filter elements of the filter must be so mounted within the reservoir that flow must take place through them. This often introducesproblems of carefully machining parts which are to fit within the reservoir, which parts must often be machined within relatively close tolerances. Such parts must also be capable of adjusting these tolerances as both the reservoir and the elements themselves change size as the fluid being passed through the filters and into the reservoir changes temperature. This problem is especially severe when the filter elements, as in accordance with the present invention, are held within a tube which is supported at each end by a pair of parallel walls of the reservoir since any difference in thermal expansion or contraction of the tube as compared to any expansion or contraction of the reservoir must be compensated for. Such problems do not occur for example in such liquid filters as are taught in U.S. Pat. No. 3,685,658 wherein a spin or thread-on type of filter and it's operation are disclosed.

The present invention provides filter means internally of the reservoir which are attached longitudinally between a first and second generally parallel wall of the reservoir and which includes a tube extending between said first and second wall of the reservoir, said tube having filter elements therewithin. Most particularly the present invention solves the problem of making such tubes fit properly within the reservoir without the requirement that the size of the tube be carefully held to very specific and small manufacturing tolerances and which further provides automatic adjustment for significant differences in the thermal expansion of the tube and of the tank of the reservoir. This and other advantages of the invention as will become apparent from the following description are accomplished by the invention as disclosed and claimed herein.

SUMMARY OF THE INVENTION

The invention is concerned wth an improvement in a hydraulic reservoir which comprises a tank having interiorly thereof filter means attached longitudinally between a first and a second generally parallel side thereof, said filter means including generally tubular filter element means extending generally longitudinally between said first and second side of said tank and means for introducing a hydraulic fluid from an exterior of said tank to an interior of said element means from adjacent said first side of said tank. The improvement of the invention comprises a tube within said tank surrounding said element means and extending longitudinally generally the length thereof, said tube including exit means therethrough through which said hydraulic fluid passes after passage thereof from the interior to an exterior of said element means and means for compressibly sealing a first end of said tube adjacent said second side of said tank.

BRIEF DESCRIPTION OF THE DRAWINGS

The invention will be better understood by reference to the figures of the drawings wherein like numbers denote like parts throughout and wherein:

FIG. 2 comprises a view taken along the line II—II of FIG. 1; and

FIG. 3 comprises a view taken along the line III—III of FIG. 1.

DETAILED DESCRIPTION OF THE PREFERRED EMBODIMENT

Figure 1:
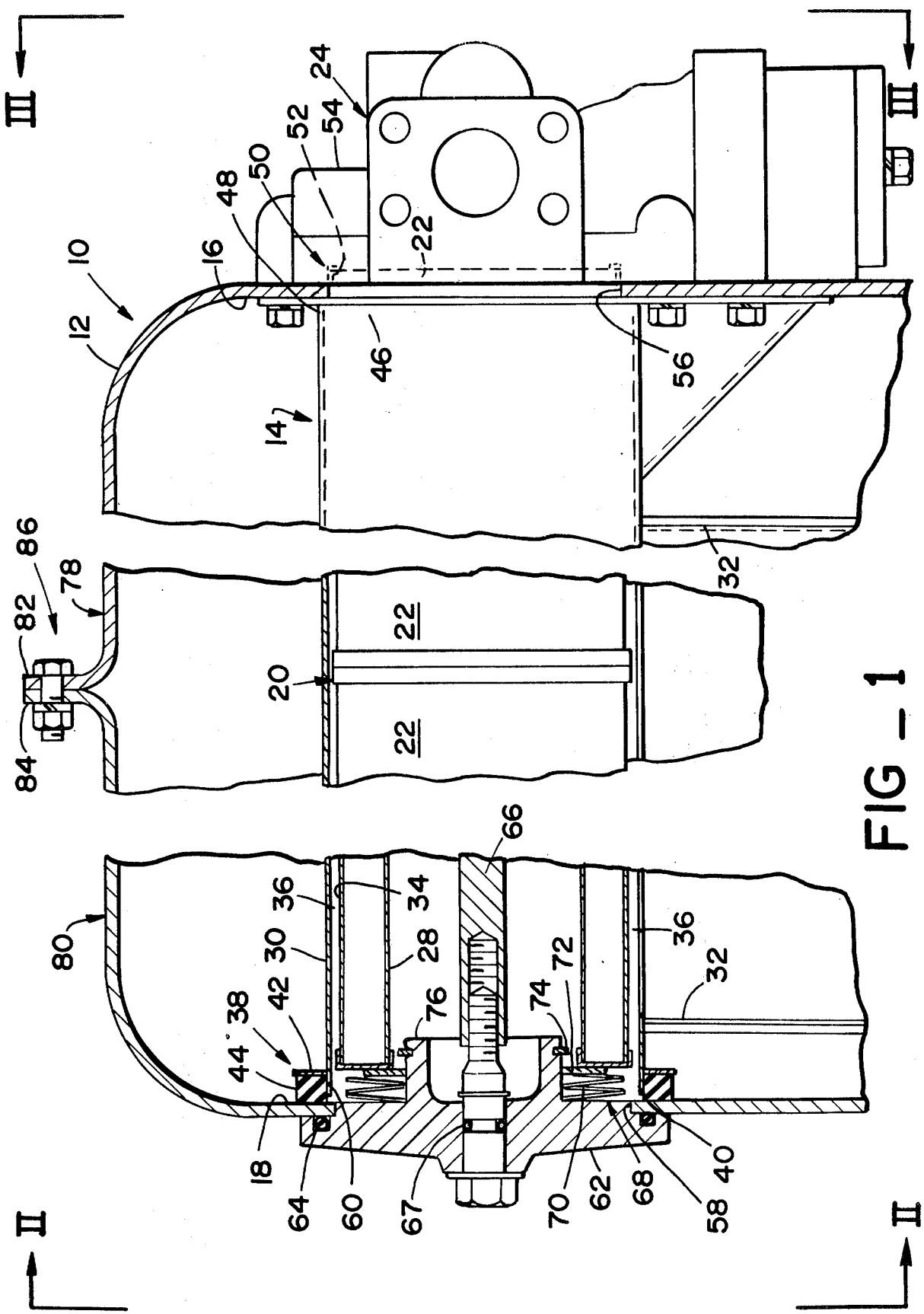
FIG. 1 comprises a partial side section view of a hydraulic reservoir including the improvement of the present invention.

Turning first to FIG. 1 there is illustrated therein a hydraulic reservoir 10 which comprises a tank 12 having internally thereof filter means 14 attached longitudinally between a first side 16 and a second generally parallel side 18 of the tank 12. The filter means 14 includes generally tubular filter element means 20 which in the particular embodiment illustrated comprises four filter elements 22 which are shown most clearly in FIGS. 1 and 2. Hydraulic fluid introducing means 24 shown most clearly in FIGS. 1 and 3 provide means for introducing a hydraulic fluid from an exterior of the tank, generally from a hydraulic system 26 illustrated schematically in FIG. 3 to an interior 28 of the filter element means 20 from adjacent the first side 16 of the tank 12.

The invention is particularly concerned with a tube 30 within the tank 12 which surrounds the filter element means 20 and extends longitudinally generally the length of said filter element means 20. The tube 30 includes exit means 32 therefrom generally from the bottom thereof through which the hydraulic fluid passes after passage of the hydraulic fluid from the interior 28 of the filter element means 20 to an exterior 34 of the filter element means 20. More particularly, the exit means 32 leads from a chamber 36 formed between the filter element means 20 and the tube 30 generally to the inside of the hydraulic reservoir 10.

The tube 30 is compressibly sealed by compressible sealing means 38 in such a manner that a first end 40 of the tube 30 is held adjacent the second side 18 of the tank 12. The compressible sealing means of the present invention preferably comprises a flange 42 which extends peripherally outwardly from the tube 30 adjacent the first end 40 thereof and a compressible elastomeric gasket 44 which is compressed between the flange 42 and the second side 18 of the tank 12.

The improvement of the present invention preferably includes rigid attaching means 46 for rigidly attaching a second end 48 of the tube 30 adjacent the first side 16 of the tank 12. Holding means 50 for the filter element means 20 also preferably form a part of the improvement of the present invention. The holding means can simply comprise a pilot 52 in a port closure means 54 which covers a port 56 in the first side 16 of the tank 12. Two of the four filter elements 22, one of which is shown in FIG. 1, are thus rigidly held by the pilot 52.

An opening 58 through the second side 18 of the tank 12 provides access to an interior 60 of the tube 30 adjacent the first end 40 thereof. The opening 58 is sized to allow entry of the filter element means 20 and more particularly of the four filter elements 22 to the interior 60 of the tube 30. Cover means 62 is provided which is sealingly attachable, as for example by using a seal ring 64, over the opening 58. The cover means 62 is attachable longitudinally through the tube 30 to adjacent the first side 16 of the tank 12 and more specifically is attachable to the port closure means 54 as by being screwed into the port closure means 54 via an elongated bolt means 66. The bolt means 66 pass through the cover means 62 and are sealed thereto by a seal ring 67. Compressible positioning means 68, in the embodiment illustrated a plurality of axially compressible resilient washers 70 which bear against a retaining washer 72 serve to compressibly hold the filter element means 20 between the first side 16 and the second side 18 of the tank 12. A retaining ring 74 generally serves to hold the plurality of resilient washers 70 and the retaining washer 72 from escaping from an extension 76 which extends from the cover 62 towards the first side 16 of the tank 12.

The tank 12 of the preferred embodiment includes means for disassembling it into a first art 78 which includes the first side 16 as part thereof and a second part 80 which includes the second side 18 of the tank 12 as part thereof. The disassembling means for the tank generally includes the pair of flanges 82 and 84 extending respectively from the first part 78 and the second part 80 of the tank 12 and a plurality of bolt-nut means 86 fastening the first flange 82 to the second flange 84. Because of this disassembleability of the tank 12 the tube 30 can be readily placed therewithin and the port closure means 54 can be attached from the interior of the tank 12 when the first part 78 thereof is separated from the second part 80 thereof. After the tube 30 has been attached to the first part 78 and more particularly to the first side 16 of the tank 12 the gasket 44 can be put in place adjacent the flange 42 and the bolt-nut means place. The filter element means 20 can be put in place either when the tank 12 is disassembled into the first part 78 and the second part 80 thereof or can be put in place through the opening 58 before or after removal of the cover 62.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a hydraulic reservoir which comprises a tank having internally thereof filter means attached longitudinally between a first and a second generally parallel side thereof, said filter means including generally tubular filter element means extending generally longitudinally between said first and second sides of said tank and means for introducing a hydraulic fluid from an exterior of said tank to an interior of said element means from adjacent said first side of said tank, an improvement comprising:
   a tube within said tank surrounding said element means and extending longitudinally generally the length thereof, said tube including exit means therethrough through which said hydraulic fluid passes after passage thereof from the interior to an exterior of said element means; and
   means for compressibly sealing a first end of said tube adjacent said second side of said tank.

2. An improvement as in claim 1, wherein said compressible sealing means comprises a flange extending peripherally outwardly from said tube adjacent said first end thereof and a compressible elastomeric gasket compressed between said flange and said second side of said tank.

3. An improvement as in claim 2, including means for rigidly attaching a second end of said tube adjacent said first side of said tank.

4. An improvement as in claim 3, wherein said tank includes means for disassembling it into a first part including said first side thereof and a second part including said second side thereof.

5. An improvement as in claim 4, including:
   an opening through said second side of said tank to an interior of said tube adjacent said first end thereof sized to allow entry of said element means to the interior of said tube; and
   cover means sealingly attachable over said opening and attachable longitudinally through said tube to adjacent said first side of said tank to compressibly hold said element means between said first and second sides of said tank.

* * * * *